Jan. 18, 1966 G. J. GILBERT ETAL 3,230,020
LUBRICATOR FOR DRILL BIT
Filed July 18, 1963 2 Sheets-Sheet 1
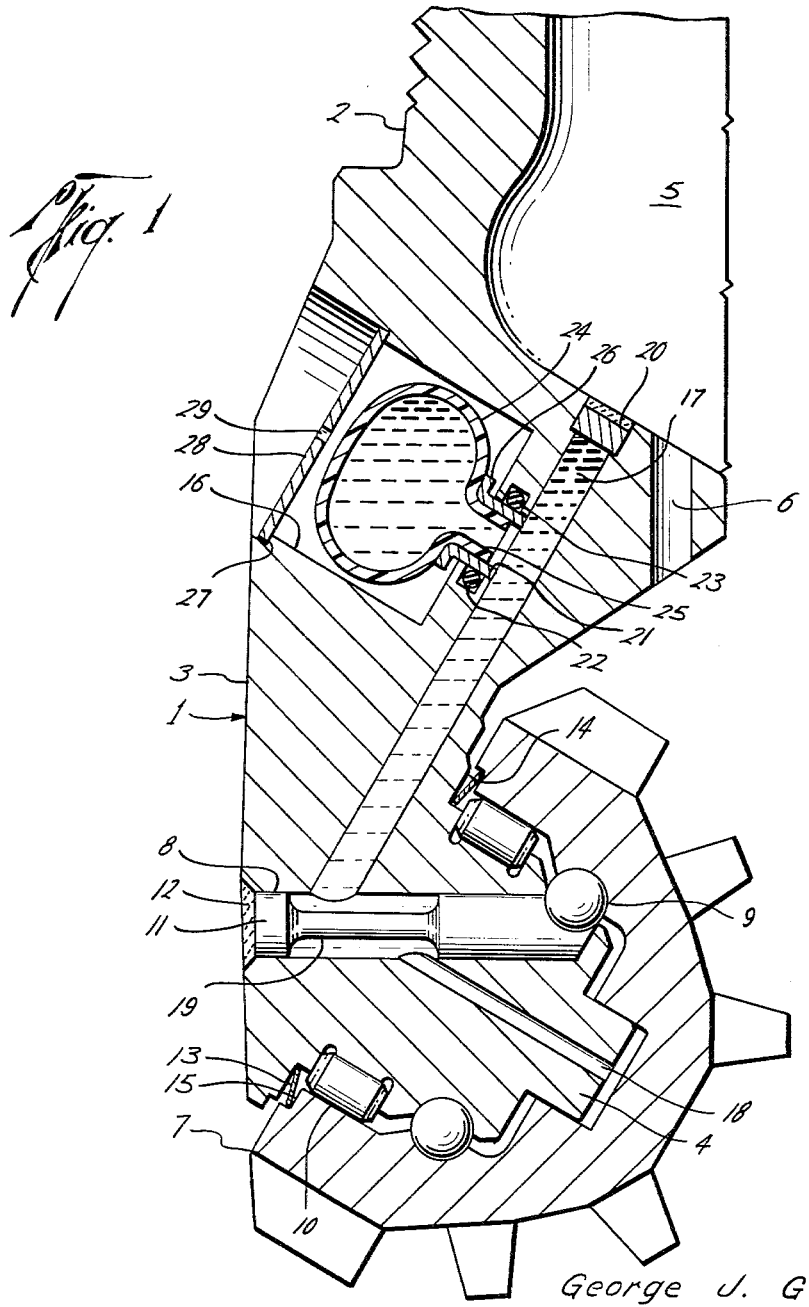
George J. Gilbert
Percy W. Schumacher, Jr.
INVENTORS
BY Vincent Martin
Joe E. Edwards
M. Harvey Gay
ATTORNEYS Jan. 18, 1966   G. J. GILBERT ETAL   3,230,020
LUBRICATOR FOR DRILL BIT
Filed July 18, 1963   2 Sheets-Sheet 2
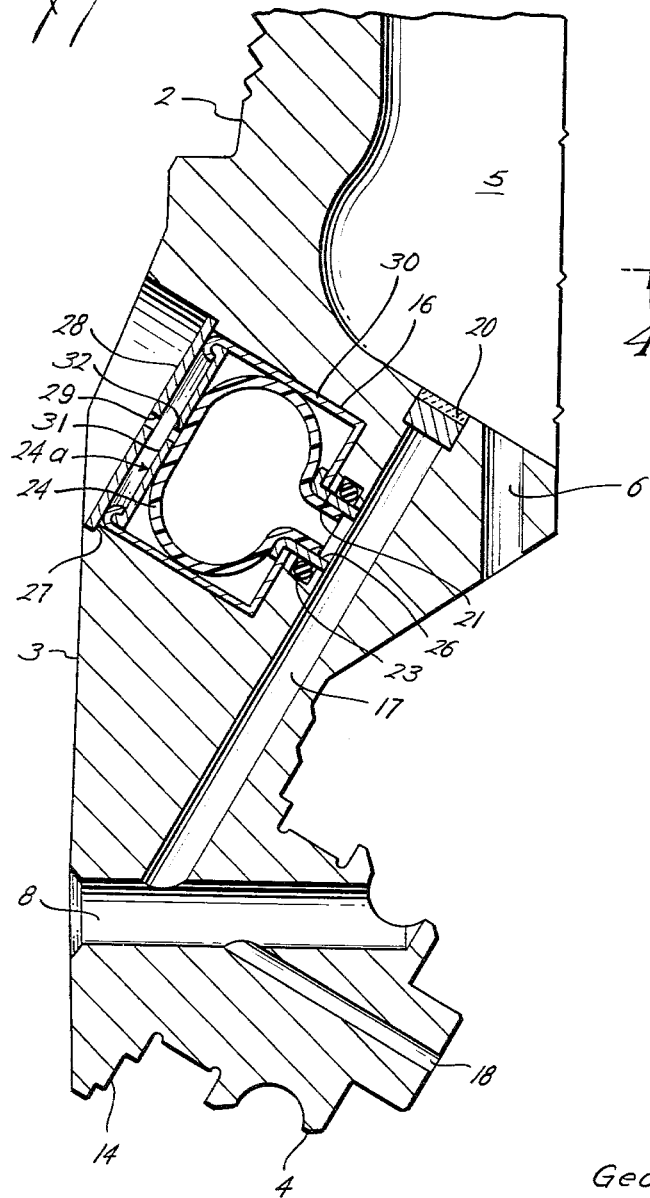
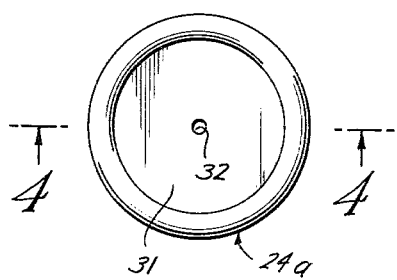
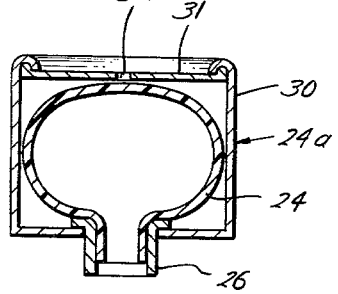
George J. Gilbert
Percy W. Schumacher, Jr.
INVENTORS
BY Vincent Martin
Jos E. Edwards
M. Harvey Gay
ATTORNEYS

United States Patent Office 3,230,020
Patented Jan. 18, 1966

3,230,020
LUBRICATOR FOR DRILL BIT
George J. Gilbert and Percy W. Schumacher, Jr., Houston, Tex., assignors to Reed Roller Bit Company, Houston, Tex., a corporation of Texas
Filed July 18, 1963, Ser. No. 295,892
1 Claim. (Cl. 308—8.2)

This invention relates generally to roller drill bits employed in the drilling of deep wells, and more particularly to a lubricating system therefor.

In earth boring, conditions are sometimes encountered wherein extremely abrasive surroundings subject the bearings of drill bit rollers to severe wear. Moreover, the drilling fluid which is circulated downwardly through a drill stem and the drill bit may contaminate the lubricant in the bit with the result that the bearing life of the drill bit may be impaired.

It is an object of this invention to provide a new and improved lubrication system for a roller drill bit wherein the bit bearings are sealed and a lubricant reservoir is provided to supply lubricant to the bearings.

Another object is to provide a new and improved sealed bearing system for a roller drill bit which includes a lubricant reservoir arrangement which is adapted to compensate for rapid volumetric changes or fluctuations of the lubricant within the bit and reservoir during the drilling operation.

Another object is to provide a new and improved lubrication system for a drill bit wherein a resilient or flexible bladder is used as a lubricant reservoir.

Another object is to provide a resilient or flexible bladder for a lubricant reservoir in a drill bit wherein the bladder has low inertia and is adapted to accommodate rapid volumetric changes or vibrations within the lubricant system.

Another object is to provide a lubricating system for a drill bit which requires few accurately machined attendant parts, and which is economical to manufacture.

Another object is to provide a removable or replaceable lubricant-containing member for a drill bit lubricating system.

Other objects will become apparent from the following description and accompanying drawings, in which:

FIG. 1 is a sectional view through one of the cutter assemblies of a cone type bit employing the invention.

FIG. 2 is a sectional view similar to FIG. 1 but with the cutter and bearings removed, showing another embodiment of the invention.

FIG. 3 is an end view of the bladder assembly shown in FIG. 2.

FIG. 4 is a sectional view taken along lines 4—4 in FIG. 3.

Referring to the drawings, a drill bit 1 comprises a bit head 2 having downwardly extending legs or bearing extensions, one of which is shown at 3. Each leg has an integral bearing shaft 4 which extends inwardly and downwardly toward the axis of the bit. The bit head 2 may have an internal chamber 5 through which drilling fluid is conducted downwardly through passageway 6 to impinge the drill bit cutters, one of which is shown at 7.

The shaft 4 has a bore 8 which extends from the exterior of the leg 3 to complemental ball bearing raceways in the cutter 7 and the shaft 4. Ball bearings 9 may be supplied to the raceways through the bore 8. The cutter 7 and the shaft 4 have complemental roller bearing raceways with roller bearings 10 in such raceways. A contoured ball retaining plug 11 may be inserted into the bore 8, and secured therein by means of a weld 12, to retain the ball bearings 9 in place, as is well known in the art.

An annular bearing seal 13 may be disposed between a surface 14 of the bit leg 3 and an annular recess 15 in the cutter 7. The arrangement of the seal is such that when the cutter 7 is installed on the shaft 4, the seal 13 is precompressed axially to some predetermined extent.

The bit head 2 is provided with a recess 16 which extends inwardly from the exterior surface of said head. The head 2 has a passageway 17 drilled from the chamber 5 to the bore 8. The shaft 4 has a passageway 18 extending from the inner end thereof to the bore 8. The plug 11 has a reduced portion 19 which is arranged to be adjacent the lower end of the passageway 17 and the upper end of the passageway 18 to establish communication between such passageways. The upper end of the passageway 17 may be plugged by means of a weld 20 or the like. The recess 16 has an opening 21 connecting the recess to passageway 17. The wall of the opening 21 is grooved as shown at 22 to accommodate an O-ring seal 23.

A flexible bladder, or bag, 24 which may be made of neoprene or the like, has an extending spout 25. A rigid, flanged sleeve 26 encircles the spout 25 and is secured thereto by means of vulcanizing or in any other suitable manner. The external diameter of the axially extending portion of the flanged member 26 is such that when it is inserted into opening 21 it forms a sealing engagement with the O-ring 23. The wall of the recess 16 has a shoulder 27 against which is disposed a retaining disc 28 which is arranged to frictionally engage the walls to retain the bladder 24 in place. The disc 28 has a vent 29 communicating with the exterior of the drill bit. The bladder 24 contains a supply of lubricant which lubricant is supplied to the interior of the cutter 7 and the bearings therein through the spout 25, the passageway 17 and the passageway 18. Since the bladder 24 and the seal 13 are exposed to the exterior of the bit, the arrangement provides for balance of ambient pressures on the lubricator system. The bladder 24 may be made of a resilient, flexible material and may have relatively low inertia, and being resilient provides resiliency for the lubricator system to attenuate rapid volumetric changes or vibrations of the lubricant which may be caused by the movement of the cutter 7 and the bearings 9 and 10 on the shaft 4 during drilling operations. The bladder being made of such flexible material, and exposed to the exterior pressure surrounding the bit, will collapse as lubricant escapes from the bearings, and the exterior pressure acting on the bladder will collapse the same until all of the lubricant therein has been fed into the passageways communicating with said bearings.

If desired, the flanged member 26 may be arranged to be threadedly secured in the opening 21.

Although the bladder, or bag, 24 is preferably made of a resilient or flexible material, it may be made of tin or soft aluminum, such as is used for tooth paste tubes or the like.

In the embodiment shown in FIGS. 2, 3 and 4, a bladder assembly 24a is shown comprising a bladder 24 enclosed in a cuplike member 30. A top member 31 is crimped to the cuplike member 30 or secured thereto in any other suitable manner. The top member 31 has a vent 32 extending therethrough. The bladder assembly 24a is secured in place by means of the retaining disc 28 in a manner previously described.

As will be apparent, the lubricant supply may be readily replenished by removing the disc 28 and the spent bladder, and inserting another bladder 24 having a supply of lubricant therein, or inserting the bladder assembly 24a, into the recess 16 whereby the flanged member 26 is inserted through the O-ring member 23, whereupon the disc 28 may be driven in place in order to secure the bladder or bladder assembly in said recess.

During the drilling operation, as lubricant is lost from the cutter 7, usually past the seal 13, it is replenished from the bladder 24, which collapses inwardly a compensating distance. Since the bladder 24 and the seal 13 are exposed to the same ambient pressures, the lubricator system of the invention provides a balanced arrangement whereby reasonably uncontaminated lubricant is afforded to the interior of the rock bit cutter and bearings so long as any lubricant remains in the bladder 24. Also, the invention provides a large, effective lubricant reservoir for a drill bit wherein the lubricating system is closed or isolated from the ambient drilling fluid, and wherein no piston is necessary to follow the lubricant as it is used from the reservoir. In such an arrangement, various configurations of the bladder may be employed to afford a large lubricant reservoir without dangerously weakening the structure of a drill bit, and such system also provides a lubricator for a drill bit wherein tolerances do not have to be held closely for most of the parts therein employed, and further, it provides a system that is easily serviced or repaired.

This invention is not limited to the embodiments shown. Various changes within the scope of the following claim will occur to those skilled in the art.

What is claimed is:

A rock bit having a depending leg and a bearing shaft thereon, a roller cutter mounted on said shaft, a seal between the cutter and the shaft, the said depending leg having a lubricant reservoir therein, the reservoir comprising a flexible lubricant-containing bladder having a spout at one side thereof, said bladder being enclosed within a canister which is removably secured in said bit, and means forming a passageway communicating between the said spout and the interior of said roller cutter, a disc adapted to retain said reservoir in said leg, said disc having a vent therethrough communicating with the exterior of said bit, said canister being vented to the exterior of the bit in cooperation with said disc.

References Cited by the Examiner
UNITED STATES PATENTS

| | | | |
|---|---|---|---|
| 1,334,632 | 3/1920 | Pickin | 175—228 |
| 3,007,750 | 11/1961 | Cunningham. | |
| 3,007,751 | 11/1961 | Eenink | 175—228 X |
| 3,048,230 | 8/1962 | Angel | 175—228 |
| 3,096,835 | 7/1963 | Neilson | 175—228 X |

JACOB L. NACKENOFF, *Primary Examiner.*

BENJAMIN BENDETT, CHARLES E. O'CONNELL,
*Examiners.*

W. J. MALONEY, E. R. PURSER, *Assistant Examiners.*